(12) United States Patent
Loos et al.

(10) Patent No.: US 12,231,021 B2
(45) Date of Patent: Feb. 18, 2025

(54) ROTOR SHAFT OF AN ELECTRIC MOTOR

(71) Applicant: Bayerische Motoren Werke Aktiengesellschaft, Munich (DE)

(72) Inventors: Daniel Loos, Unterschleissheim (DE); Yann Tremaudant, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 339 days.

(21) Appl. No.: 17/428,845

(22) PCT Filed: Mar. 16, 2020

(86) PCT No.: PCT/EP2020/057032
§ 371 (c)(1),
(2) Date: Aug. 5, 2021

(87) PCT Pub. No.: WO2020/200715
PCT Pub. Date: Oct. 8, 2020

(65) Prior Publication Data
US 2022/0131441 A1    Apr. 28, 2022

(30) Foreign Application Priority Data
Apr. 5, 2019    (DE) ..................... 10 2019 108 943.3

(51) Int. Cl.
*H02K 7/00* (2006.01)
*H02K 9/28* (2006.01)
*H02K 13/00* (2006.01)

(52) U.S. Cl.
CPC ............... *H02K 7/003* (2013.01); *H02K 9/28* (2013.01); *H02K 13/003* (2013.01)

(58) Field of Classification Search
CPC ........ H02K 7/003; H02K 9/28; H02K 13/003; H02K 13/02; H02K 19/00; H02K 19/16
See application file for complete search history.

(56) References Cited

U.S. PATENT DOCUMENTS

| | | |
|---|---|---|
| 2002/0190598 A1 | 12/2002 | Bartman |
| 2016/0254731 A1 | 9/2016 | Roos |
| 2018/0323687 A1 | 11/2018 | Strasinsky |
| 2018/0358867 A1 | 12/2018 | Paul et al. |
| 2019/0044402 A1 | 2/2019 | Weber |

FOREIGN PATENT DOCUMENTS

| | | |
|---|---|---|
| CN | 105932850 A | 9/2016 |
| CN | 108292882 A | 7/2018 |
| CN | 108475968 A | 8/2018 |

(Continued)

OTHER PUBLICATIONS

English translation of WO-2017-125348-A1 (Year: 2017).*

(Continued)

*Primary Examiner* — Tulsidas C Patel
*Assistant Examiner* — Joshua M Rodriguez
(74) *Attorney, Agent, or Firm* — Crowell & Moring LLP

(57) ABSTRACT

A rotor shaft of an electric motor, in particular of an electrically excited synchronous machine, is composed of a shaft body and a power transmission module, the shaft body having a tubular open end that faces the power transmission module and forms a seat in which an end of the power transmission module located closer to the shaft body is interlockingly accommodated in the seat.

7 Claims, 4 Drawing Sheets

(56) References Cited

FOREIGN PATENT DOCUMENTS

| | | | |
|---|---|---|---|
| CN | 109327091 A | 2/2019 | |
| DE | 1 108 797 B | 6/1961 | |
| DE | 1 269 236 A | 5/1968 | |
| DE | 23 32 700 B2 | 6/1975 | |
| FR | 2588430 A1 * | 4/1987 | ............. H01R 39/34 |
| GB | 1 456 116 A | 11/1976 | |
| WO | WO 2017/125348 A1 | 7/2017 | |

OTHER PUBLICATIONS

International Search Report (PCT/ISA/210) issued in PCT Application No. PCT/EP2020/057032 dated May 29, 2020 with English translation (five (5) pages).

German-language Written Opinion (PCT/ISA/237) issued in PCT Application No. PCT/EP2020/057032 dated May 29, 2020 (six (6) pages).

German-language Search Report issued in German Application No. 10 2019 108 943.3 dated Aug. 16, 2019 with partial English translation (12 pages).

Chinese-language Office Action issued in Chinese Application No. 202080015349.6 dated Nov. 29, 2023 with English translation (16 pages).

Chinese-language Office Action issued in Chinese Application No. 202080015349.6 dated Apr. 27, 2024 with English translation (13 pages).

* cited by examiner

ROTOR SHAFT OF AN ELECTRIC MOTOR

BACKGROUND AND SUMMARY OF THE INVENTION

The invention relates to a rotor shaft of an electric motor, in particular a rotor shaft of an energized synchronous machine.

Electric motors for use as an electric traction machine for hybrid and electric vehicles have to have a high power density and a very high degree of efficiency with costs which are as small as possible. In order to achieve the desired power density, high speed electric motors are used which, however, are subject to even higher mechanical loads.

Energized synchronous machines afford the advantage that rare earth metals are not required for manufacturing them, since the rotor magnetic field is generated by way of windings, through which current flows. The costs can be lowered by way of this design. In the case of known concepts, the rotor shaft serves both for mounting of the rotor and the transmission of power to driven components, and for the current supply of the rotor windings.

It is an object of the invention to provide a rotor shaft which withstands high mechanical loads and which is simple and inexpensive to manufacture.

This object is achieved by way of a rotor shaft of an electric motor according to the claimed invention. The rotor shaft of the electric motor, in particular of an energized synchronous machine, is composed of a shaft body and a current transmission module, the shaft body having a tubular open end which is directed toward the current transmission module and forms a receptacle, and a shaft body-side end of the current transmission module being received in the receptacle in a positively locking manner. It has been shown that, during operation of the electric motor, a rotor shaft of this type has a considerably higher inherent rigidity and stability and also considerably better vibration properties than conventional rotor shafts. This allows a higher maximum rotational speed to be provided or, in the case of a lower maximum rotational speed, a reduction of the material thickness.

In order to manufacture the rotor shaft, the shaft body is preferably pressed onto the current transmission module, with the result that the shaft body-side end of the current transmission module protrudes into the receptacle and lies within the shaft body.

The entire rotor shaft can be designed with an external diameter which remains substantially constant over its entire length. In particular, steps, shoulders or indents which serve for the fastening of the current transmission module do not have to be provided in the outer surface of the shaft body.

The outer surface of the shaft body-side end of the current transmission module is preferably in positively locking contact over the predominant portion thereof with the inner side of the receptacle, with the result that a stable connection is formed between the shaft body and the current transmission module.

The shaft body-side end of the current transmission module has, for example, an axial projection which ends in a circumferential shoulder, the shaft body-side end of the current transmission module protruding into the receptacle at the end of the shaft body to such an extent that the shoulder bears against an end face of the shaft body. Here, the end face preferably also forms the axial end of the shaft body. In this case, the shaft body and the current transmission module can be joined together in such a way that a continuous outer surface with a constant diameter is produced at the transition between the shaft body and the current transmission module. It has been shown that the vibration behavior of the rotor shaft can be improved further in this way.

In one preferred embodiment, the current transmission module comprises a main body which is made from a first material and electric contact elements which are made from a second material and are provided on the main body.

The first material is preferably the material of the shaft body.

The second material should be satisfactorily electrically conducting and can be, for example, copper.

The main body is the load-bearing stable component of the current transmission module, whereas the electric contact elements serve for electric contacting of the motor windings, but do not have to absorb any high forces.

The main body preferably comprises a cavity in its interior, which cavity is closed off with respect to an interior space of the shaft body, in particular is sealed against cooling fluid. This geometry can be achieved, for example, by virtue of the fact that the projection at the shaft body-side end of the current transmission module has a closed end wall which is possibly configured in one piece with the projection.

The cavity in the main body can be utilized to arrange the electric contact elements in a protected manner in the interior of the current transmission module, the electric contact elements preferably comprising conductor tracks which run on an inner side of the interior space. In this way, cables or other movable components for conducting current can be dispensed with as far as possible or completely. The contact elements can be applied to the main body by way of any suitable known method.

Conductor tracks are preferably also provided which run in contact channels which are provided in the main body, the contact channels being connected in an electrically conducting manner to contact points which are arranged on a circumferential face of the main body. The contact points serve for the electric connection to the rotor windings, and the contact channels connect the contact points in an electrically conducting manner to the conductor tracks in the interior of the cavity. A large part of the electric contacting of the rotor windings can be arranged in a protected manner in the interior of the main body in this way.

The conductor tracks and contact points are preferably applied, after the manufacture of the main body, onto the surface of the latter and into the contact channels, for example by tracks which are made from the second material being applied to surfaces of the main body.

In order to increase the material thickness of the conductor tracks, corresponding depressions or grooves, for example, can be prefabricated in the main body, by way of drilling, milling or by way of corresponding shaping if the main body is a cast part.

The contact channels can be filled completely with the second material, with the result that they also bring about the sealing of the cavity in the region of the contact points.

For external electric contacting of the current transmission module, two contact rings are preferably arranged on an outer side of the current transmission module at its end which faces away from the shaft body, as is traditionally known. The contact rings consist of a suitable, satisfactorily electrically conductive material, it being possible for a different material than the second material to be used. After the manufacture of the main body, for example, the contact rings are pressed onto this main body.

The contact points are preferably arranged spaced apart from the contact rings in the axial direction along the rotor shaft, the electric connection taking place via the conductor tracks which run in the interior of the main body and via the contact channels.

In addition or as an alternative, it is advantageous if cooling fluid channels are provided in the current transmission module, in particular in the main body thereof, which cooling fluid channels emanate from the shaft body-side end, open on an outer side of the current transmission module, and are connected fluidically to an interior space of the shaft body. Cooling fluid which flows through the interior space of the shaft body passes through the cooling fluid channels into thermal contact with the current transmission module, and can therefore cool the latter.

The cooling fluid channels preferably run along the projection in the axial direction, with the result that sufficient heat can be transmitted to the cooling fluid, in order to cool the entire current transmission module sufficiently.

The cooling fluid channels should be arranged offset in the circumferential direction with respect to the contact channels, in order to utilize the space on the main body of the current transmission module in an optimum manner.

In the following text, the invention will be described in greater detail on the basis of one exemplary embodiment and with reference to the appended drawings.

DETAILED DESCRIPTION OF THE DRAWINGS

Figure 1:
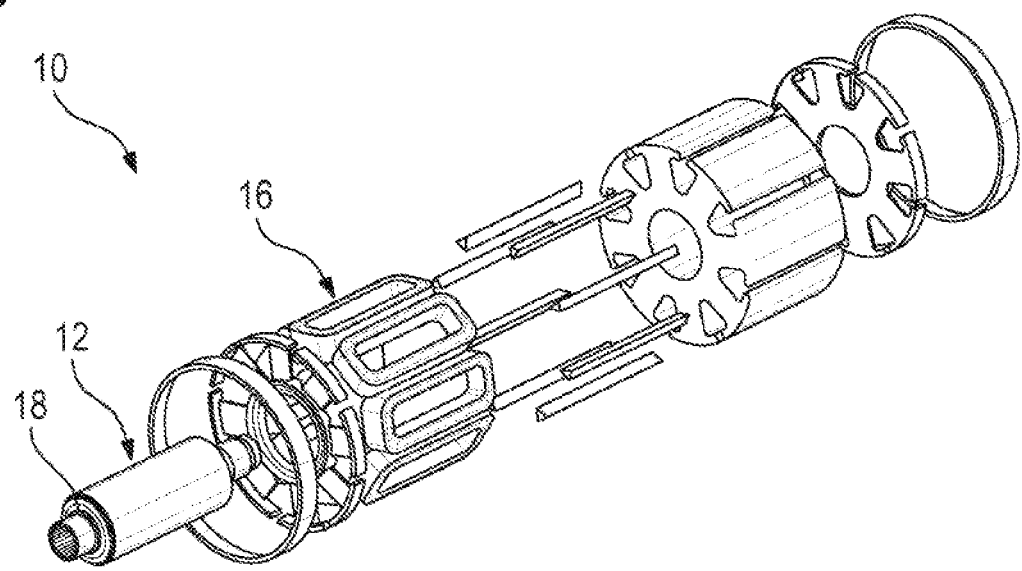
FIG. 1 shows a diagrammatic exploded illustration of a rotor of an energized synchronous machine.

FIG. 1 shows an outline sketch of a rotor 10 of an energized synchronous machine (not shown in greater detail). A rotor shaft 12 extends through the entire rotor 10, and serves both for mounting and transmission of the output power, and for the current supply of rotor windings 16 which are received on a carrier 14 and usually consist of a copper wire.

Electric connectors (conventionally in the form of two contact rings 18 at an axial end of the rotor shaft 12) are in electric contact with an external current source (not shown). Electric current is transmitted, for example, via brushes in contact with the contact rings 18 to the rotor windings 16.

FIGS. 2 to 7 show a rotor shaft 12 according to an embodiment of the invention.

The rotor shaft 12 is composed of two individual, separately prefabricated components, namely a shaft body 20 and a current transmission module 22 which are arranged behind one another in the axial direction A along the longitudinal extent of the rotor shaft 12.

Figure 3:
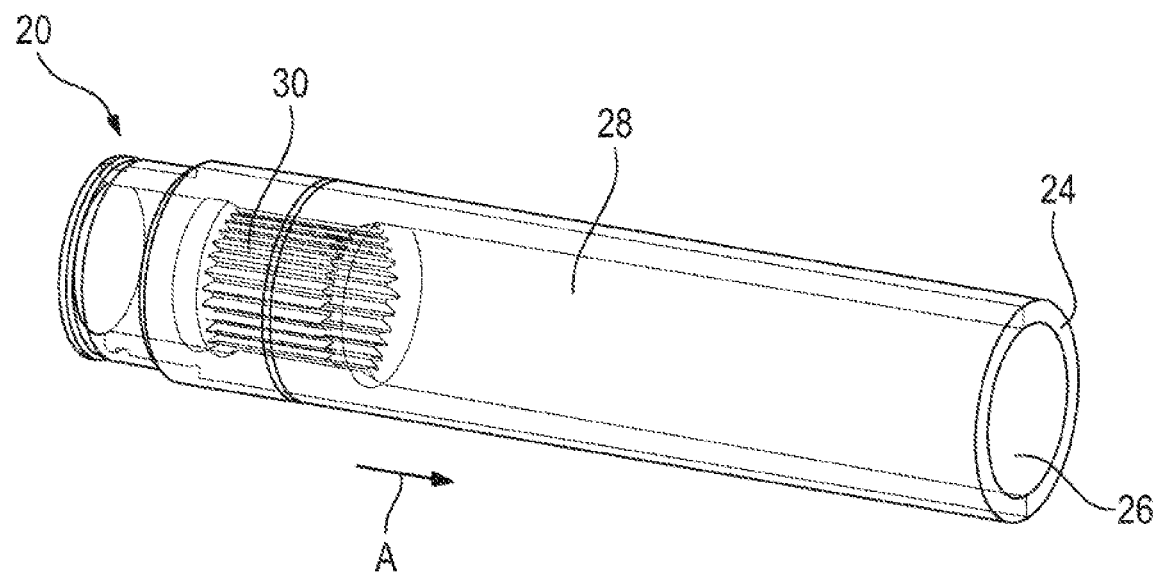
FIG. 3 shows a diagrammatic perspective illustration of a shaft body of the rotor shaft from FIG. 2.
Figure 4:
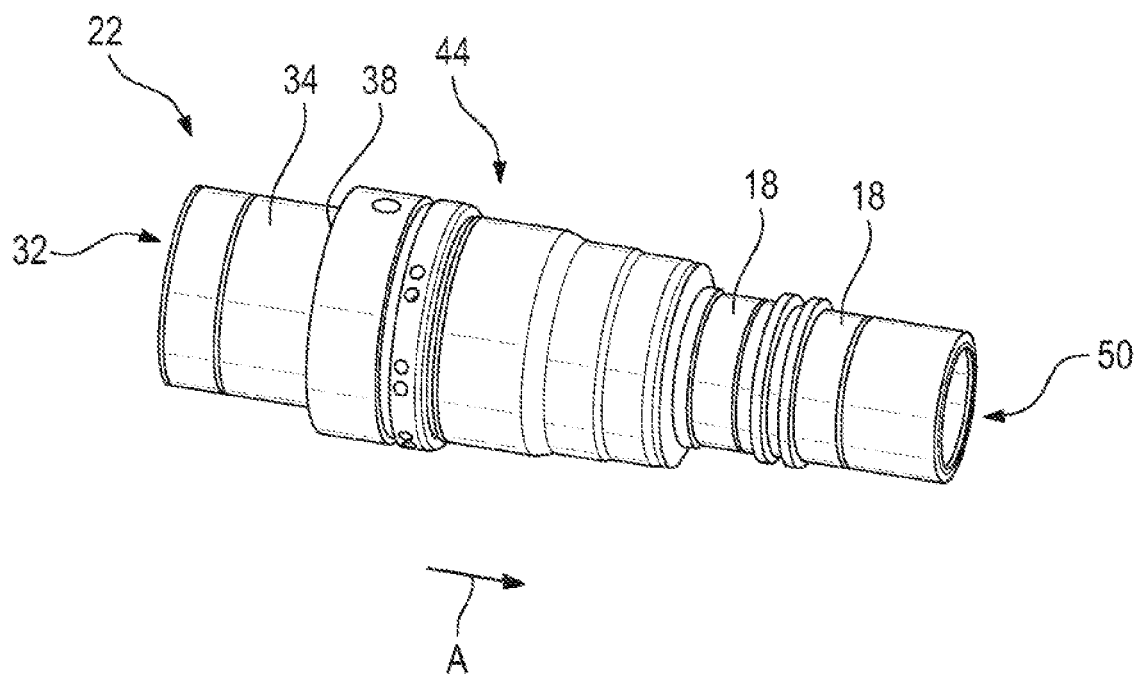
FIG. 4 shows a diagrammatic perspective illustration of a current transmission module of the rotor shaft from FIG. 2.

That end of the shaft body 20 which is directed toward the current transmission module 22 is of tubular and open design, and ends in an annular end face 24 (see, for example, FIG. 3). This open end forms a receptacle 26 with a substantially cylindrical inner wall.

In this example, the receptacle 26 merges without a change in the internal diameter of the shaft body 20 into a hollow interior space 28 of the shaft body, which hollow interior space 28 extends in the axial direction A through the entire shaft body 20.

In this example, the shaft body 20 has substantially the same external diameter over its entire longitudinal extent.

At that end which lies opposite the receptacle 26, a toothing system 30 is configured on an inner face of the shaft body, by way of which toothing system 30 an output shaft can be coupled to the rotor shaft 12.

At its shaft body-side end 32, the current transmission module 22 has a cylindrical (circular-cylindrical here) projection 34, the diameter and outer contour of which are adapted to the diameter and the inner contour of the receptacle 26. The projection 34 is delimited in the axial direction A by way of a shoulder 38.

In the case of the manufacture of the rotor shaft 12, the shaft body 20 is pressed onto the shaft body-side end 32 of the current transmission module 22 in such a way that the projection 34 is arranged completely in the interior of the receptacle 26 in the finished rotor shaft 12, and the shoulder 38 bears against the end face 24 of the shaft body 20.

Figure 2:
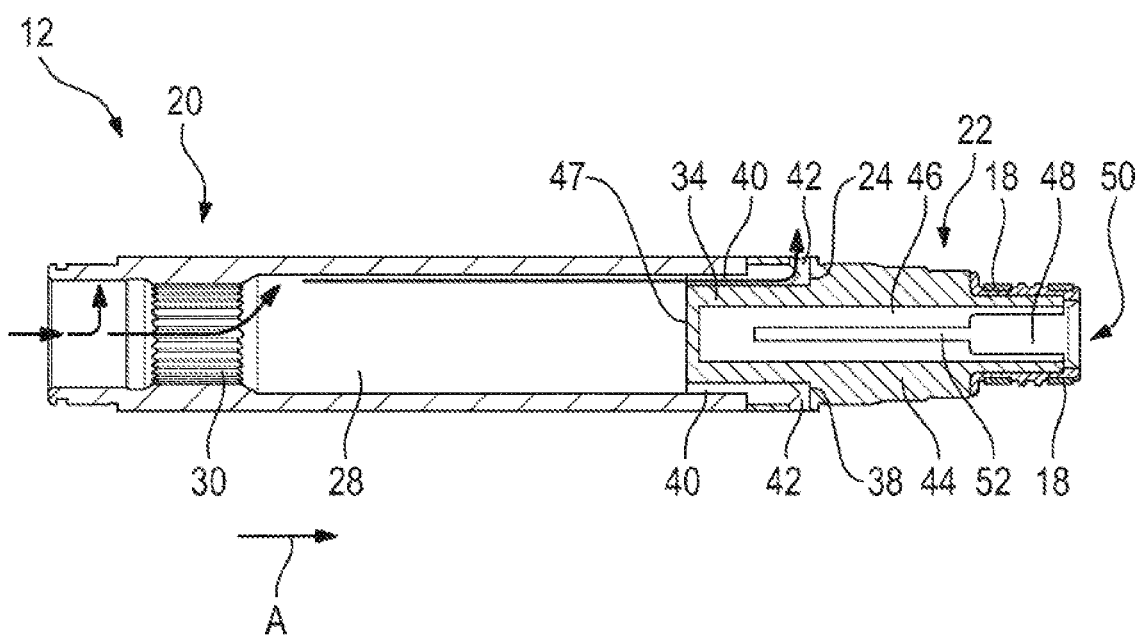
FIG. 2 shows a diagrammatic sectional view of a rotor shaft according to an embodiment of the invention.
Figure 6:
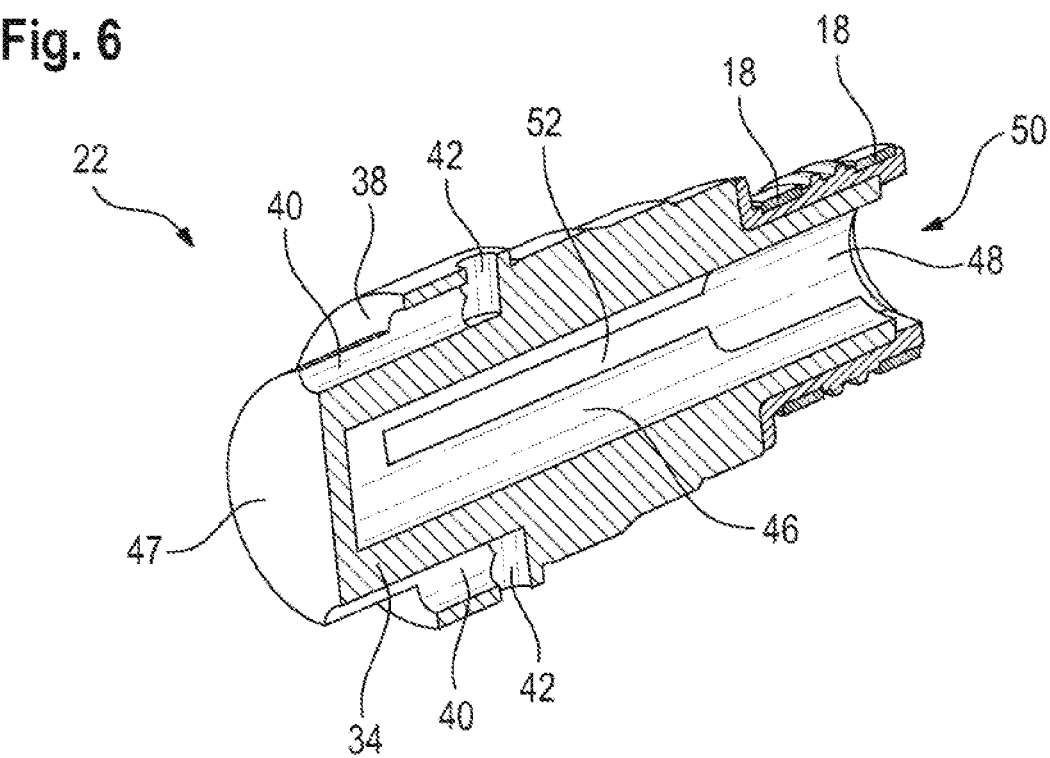
FIGS. 6 and 7 show diagrammatic perspective sectional views of the current transmission module from FIG. 4.
Figure 7:
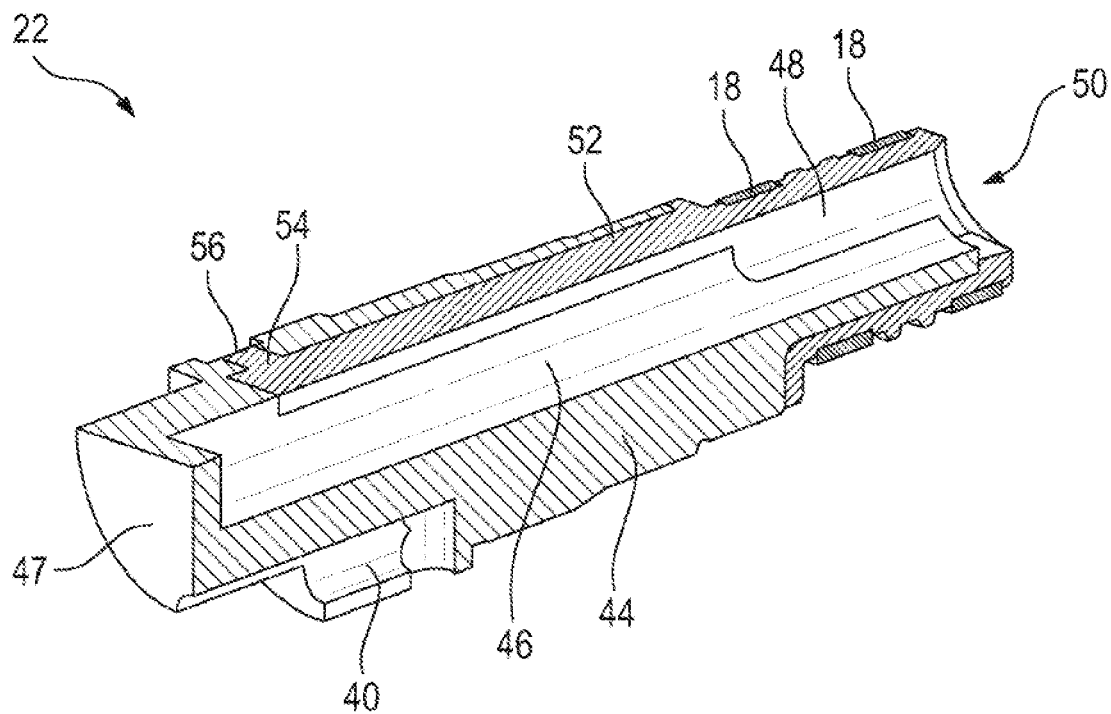

A plurality of grooves which run in the axial direction A are provided on the outer circumferential face of the projection 34, which grooves form cooling fluid channels 40 and, at the shaft body-side end 32 of the current transmission module 22, are connected fluidically to the interior space 28 of the shaft body 20. This is shown in FIGS. 2 and 6.

With the exception of the cooling fluid channels 40, the outer circumferential face of the projection 34 bears flatly and in a positively locking manner against the inner side of the receptacle 26 of the shaft body 20. This can be seen, for example, in FIG. 5.

The cooling fluid channels 40 run partially as closed channels in the current transmission module 22 until they open into outlet points 42 on the outer circumferential face of the current transmission module 22 in a manner which is remote in the axial direction A from the shaft body-side end 32.

Cooling fluid from the interior space 28 of the shaft body 20 can thus flow through the cooling fluid channels 40 along the projection 34 of the current transmission module 22 as far as the outlet points 42, and can thus cool the current transmission module 22.

The current transmission module 22 has a rigid, dimensionally stable main body 44 which consists of the same material here as the shaft body 20.

A cavity 46 is provided in the interior of the main body 44, which cavity 46 is closed off in a fluid-tight manner with respect to the interior space 28 of the shaft body 20, here by way of an end wall 47 which separates the cavity 46 from the interior space 28. The cooling fluid channels 40 do not establish a fluidic connection to the cavity 46 either, with the result that the cavity 46 always remains free of coolant.

Electric contact elements 48 are arranged on the main body 44, which electric contact elements 48 consist of a second, electrically satisfactorily conductive material which is different than the first material of the main body 44, such as copper, for example.

In this example, that end 50 of the main body 44 which is remote from the shaft body is open toward the cavity 46. The second material is applied to the main body 44 in the form of a plurality of conductor tracks 52 which run from the outer circumferential face of the main body 44 via the open end and on the inner wall of the cavity 46 as far as contact channels 54 which are configured in the main body 44 (see FIGS. 5 and 7), and through these contact channels 54 radially to the outside to in each case one contact point 56 on a circumferential face of the main body 44. The contact points 56 are spaced apart in the axial direction A from the end 50 which is remote from the shaft body.

Here, in each case one electric contact element 48 is connected electrically to a contact ring 18 at that end 50 of the main body 44 which is remote from the shaft body, for example by the contact rings 18 being pressed onto the end 50 and the electric contact elements 48 which are arranged there.

The contact rings 18 can consist of a different material than the second material, which different material possibly has a higher mechanical wear resistance if it is provided that the contact rings 18 are contacted by way of brushes.

The electric contact elements 48, the conductor tracks 52, the contact channels 54 and the contact points 56 are configured and arranged in such a way that two separate electric lines run from in each case one contact ring 18 to a contact point 56. The two contact points 56 are connected to the rotor windings 16 in the finished rotor 10, and serve for the current supply of the rotor windings 16. The two electric lines are of course insulated electrically from one another over their course, in order for it to be possible to establish a closed current circuit which is free from short-circuits via the two contact rings 18 and the rotor windings 16.

It goes without saying that further electric contact elements 48, conductor tracks 52, contact channels 54 and contact points 56 might be provided, in order to realize further electric lines for other purposes.

The contact channels 54 can be filled completely with the second material of the electric contact elements 48 from the contact points 56 as far as into the cavity 46.

It is possible for suitably shaped depressions or grooves which are filled with the second material to be provided in the region of the electric contact elements 48, in particular on the inner side of the cavity 46.

The contact channels 54 and the contact points 56 are offset along the circumference of the main body 44 with respect to the cooling fluid channels 40 and their outlet points 42, and do not have any overlaps.

The main body 44 can be manufactured in any suitable way, for example by way of a casting method, possibly combined with drilling and/or milling steps, in order to manufacture the cooling fluid channels 40, the contact channels 54 and other geometric elements.

Figure 5:
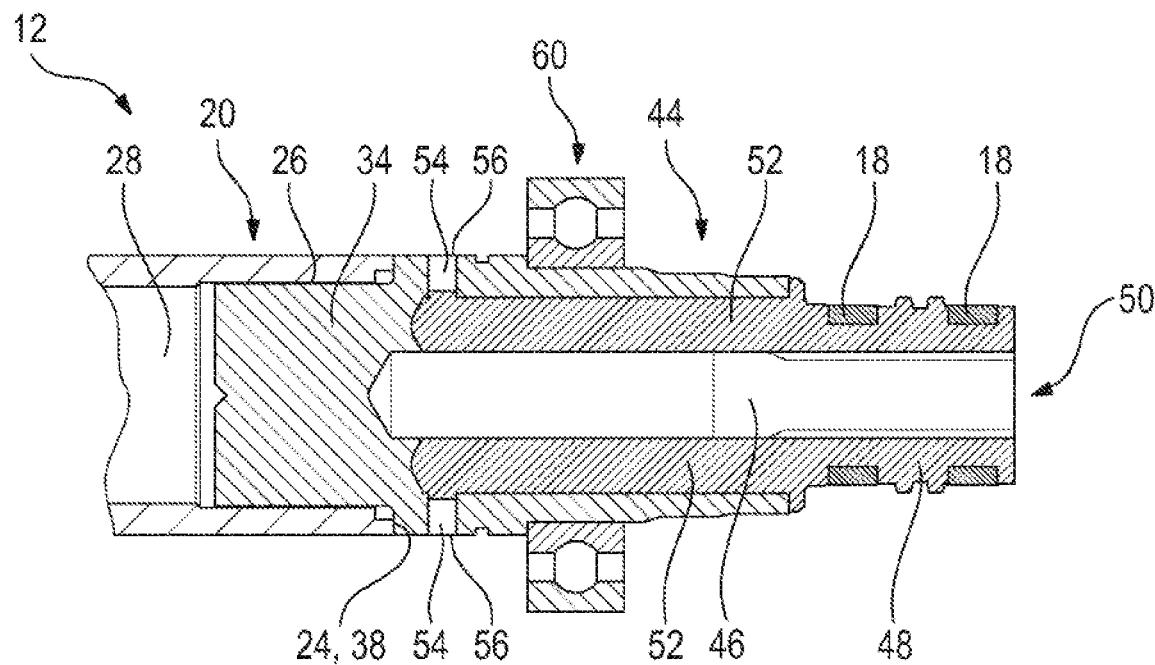
FIG. 5 shows a diagrammatic enlarged sectional view of the transition from the shaft body to the current generation module of the rotor shaft from FIG. 2.

In this example, the rotor shaft 12 is mounted in the region of the current transmission module 22 (see bearing 60 in FIG. 5). To this end, it can be provided that the main body 44 of the current transmission module 22 tapers in an axial direction A adjacently with respect to the shoulder 38, with the result that the end 50 of the current transmission module 22 can be pushed into the bearing 60.

What is claimed is:

1. A rotor shaft of an electric motor, the rotor shaft comprising:
    a shaft body; and
    a current transmission module, wherein:
    the shaft body has a tubular open end which is directed toward the current transmission module and forms a receptacle,
    a shaft body-side end of the current transmission module is received in the receptacle in a positively locking manner,
    the current transmission module comprises a main body which is made from a first material and on which electric contact elements which are made from a second material are provided,
    the electric contact elements comprise first conductor tracks which run in contact channels which are provided in an interior of the main body,
    the contact channels are connected in an electrically conducting manner to contact points which are arranged on an outer circumferential side of the main body,
    cooling fluid channels are provided in the current transmission module, and the cooling fluid channels emanate from the shaft body-side end, open on a circumferential face of the current transmission module, and are connected fluidically to an interior space of the shaft body,
    the cooling fluid channels are provided in a main body of the current transmission module, and
    the cooling fluid channels are arranged offset in a circumferential direction with respect to the contact channels.

2. The rotor shaft according to claim 1, wherein the electric motor is an energized synchronous machine.

3. The rotor shaft according to claim 1, wherein:
    the shaft body-side end of the current transmission module has an axial projection which ends in a circumferential shoulder, and
    the shaft body-side end of the current transmission module protrudes into the receptacle at an end of the shaft body to such an extent that the shoulder bears against an end face of the shaft body.

4. The rotor shaft according to claim 1, wherein the first material is a material of the shaft body.

5. The rotor shaft according to claim 1, wherein the main body comprises a cavity in an interior of the main body, and the cavity is closed off with respect to an interior space of the shaft body.

6. The rotor shaft according to claim 5, wherein the electric contact elements further comprise second conductor tracks which run on an inner side of the cavity in the main body.

7. The rotor shaft according to claim 1, wherein two contact rings are arranged on an outer side of the current transmission module at an end of the current transmission module which faces away from the shaft body.

* * * * *